(12) United States Patent
Frampton et al.

(10) Patent No.: US 12,230,969 B2
(45) Date of Patent: Feb. 18, 2025

(54) OFFLINE SYNCHRONIZATION OF GENERATORS

(71) Applicant: Kohler Co., Kohler, WI (US)

(72) Inventors: Isaac S. Frampton, Strattanville, PA (US); Adam Larson, Mequon, WI (US)

(73) Assignee: Discovery Energy, LLC, Kohler, WI (US)

( * ) Notice: Subject to any disclaimer, the term of this patent is extended or adjusted under 35 U.S.C. 154(b) by 105 days.

(21) Appl. No.: 17/560,130

(22) Filed: Dec. 22, 2021

(65) Prior Publication Data

US 2022/0115874 A1 Apr. 14, 2022

Related U.S. Application Data

(63) Continuation of application No. 16/188,670, filed on Nov. 13, 2018, now Pat. No. 11,245,266.

(51) Int. Cl.
*H02J 3/42* (2006.01)

(52) U.S. Cl.
CPC ..................... *H02J 3/42* (2013.01)

(58) Field of Classification Search
CPC ....................................... H02J 3/42
See application file for complete search history.

(56) References Cited

U.S. PATENT DOCUMENTS

| | | |
|---|---|---|
| 3,562,545 A | 2/1971 | Rubner et al. |
| 4,249,088 A | 2/1981 | Kleba et al. |
| 5,640,060 A | 6/1997 | Dickson |
| 5,729,059 A | 3/1998 | Kilroy et al. |
| 6,104,171 A | 8/2000 | Dvorsky et al. |
| 6,501,628 B1 | 12/2002 | Namba et al. |
| 6,892,115 B2 | 5/2005 | Berkcan et al. |
| 7,453,674 B2 | 11/2008 | Kuehnle et al. |
| 7,635,967 B2 | 12/2009 | Loucks et al. |
| 7,656,060 B2 | 2/2010 | Algrain |
| 7,667,351 B2 * | 2/2010 | Marwali ................ H02J 9/062 307/87 |
| 7,816,813 B2 | 10/2010 | Yagudayev et al. |
| 8,106,633 B2 | 1/2012 | Dozier et al. |
| 8,494,795 B2 | 7/2013 | Zweigle et al. |

(Continued)

FOREIGN PATENT DOCUMENTS

| | | |
|---|---|---|
| EP | 3035480 A1 | 6/2016 |
| JP | 0767259 A | 3/1995 |
| JP | 4258779 B2 | 2/2009 |

OTHER PUBLICATIONS

European Search Report for European Patent Application No. 19203622.6-1202 dated Dec. 5, 2019.

(Continued)

*Primary Examiner* — Jared Fureman
*Assistant Examiner* — Michael J Warmflash
(74) *Attorney, Agent, or Firm* — The Belles Group, P.C.

(57) ABSTRACT

A system and method for paralleling generators is described. A timing signal indicative of a waveform reference point of at least a first generator of the generators is received at a second generator. The receiving generator determines a closing time for a second generator breaker associated with the second generator in response the timing signal from the first generator. The first generator breaker and the second generator breaker, or an aggregated generator breaker is closed to a bus at the closing time.

18 Claims, 13 Drawing Sheets

(56) References Cited

U.S. PATENT DOCUMENTS

| | | | |
|---|---|---|---|
| 8,553,436 B2 | 10/2013 | Ohshima et al. | |
| 8,766,479 B2 | 7/2014 | Dorn et al. | |
| 9,128,130 B2 | 9/2015 | Seeley | |
| 9,368,972 B2 | 6/2016 | Frampton | |
| 9,467,080 B2 | 10/2016 | Frampton et al. | |
| 9,478,378 B2 | 10/2016 | Kasztenny et al. | |
| 9,876,454 B2 | 1/2018 | Rodriguez | |
| 11,245,266 B2 * | 2/2022 | Frampton | H02J 3/42 |
| 2009/0108678 A1 | 4/2009 | Algrain | |
| 2010/0007207 A1 | 1/2010 | Peuser | |
| 2011/0148214 A1 * | 6/2011 | Dahlen | H02J 13/00007 |
| | | | 307/87 |
| 2012/0049638 A1 * | 3/2012 | Dorn | H02J 3/42 |
| | | | 307/87 |
| 2014/0001873 A1 | 1/2014 | Tian et al. | |
| 2015/0186676 A1 * | 7/2015 | Arora | G06F 21/725 |
| | | | 713/187 |
| 2017/0271881 A1 | 9/2017 | Walters | |
| 2017/0279280 A1 | 9/2017 | Shakeel et al. | |
| 2018/0034276 A1 | 2/2018 | Cummins | |
| 2020/0153251 A1 * | 5/2020 | Frampton | H02J 3/42 |

OTHER PUBLICATIONS

Mota, A. A., L. T. M. Mota, and A. Morelato. "Dynamic Evaluation of Reenergization Times During Power Systems Restoration." 2004 IEEE/PES Transmision and Distribution Conference and Exposition: Latin America (IEEE Cat. No. 04EX956). IEEE, Nov. 8, 2004. (pp. 161-166).

* cited by examiner

OFFLINE SYNCHRONIZATION OF GENERATORS

CROSS REFERENCE TO PRIOR APPLICATIONS

This application is a continuation under 37 C.F.R. § 1.53(b) and 35 U.S.C. § 120 of U.S. patent application Ser. No. 16/188,670, filed Nov. 13, 2018, which is hereby incorporated by reference in its entirety.

FIELD

This application relates to the fields of generators, and more specifically, to the synchronization of parallel generators.

BACKGROUND

Two or more generators may be connected in parallel (referred to as parallel or paralleled generators) to supply power to a home, business, vehicle, boat, or another entity. In some examples, the parallel generators may operate as a secondary source of power, and may be turned on in the event of a failure of another source of power. In other examples, a system of paralleled generators may be the primary source of power, such as in remote locations, in boats, in applications where it may be more economically feasible to generate power onsite, or in other vehicles.

Parallel generators offer numerous advantages over systems powered with a single generator. A system of paralleled generators may incorporate multiple smaller generators in place of a more expensive and larger generator, which may require a larger footprint for installation than multiple smaller generators. Accordingly, the multiple smaller generators may allow for more flexibility in placement than one larger generator. Additionally, the system of paralleled generators may offer redundancy, which may provide a system with consistency and reliability. With multiple paralleled generators, if one of the parallel generators malfunctions, the load may be redistributed to the other generators immediately. The redundancy also allows for maintenance and repair to take place at one of the generators without disrupting the supply from the remaining paralleled generators. As another advantage, a system of parallel generators may be expanded incrementally as needs of the system increase.

A paralleling generator system may also increase flexibility by allowing the generators in the system to operate at a variety of load levels, depending on the number of generators supplying the load. As an example, three 1 MW generators powering a 2 MW load may operate at 67% of capacity, while two 1 MW generators supplying the same load may operate at 100% of capacity and four 1 MW generators supplying the same load may operate at 50% of capacity. The ability to adjust the loading on each generator by changing the number of generators used to supply the load may improve versatility in resolving such concerns as wet-stacking, excessive fuel consumption, frequent regeneration cycles of a diesel particulate filter, and similar engine-load-related concerns.

In some arrangements, parallel generators may require complex hardware for synchronizing the generators and bringing the generators into parallel operation. The following disclosure provides improved systems and techniques for paralleling generators.

BRIEF DESCRIPTION OF THE DRAWINGS

Exemplary embodiments are described herein with reference to the following drawings.

DETAILED DESCRIPTION

Figure 1:
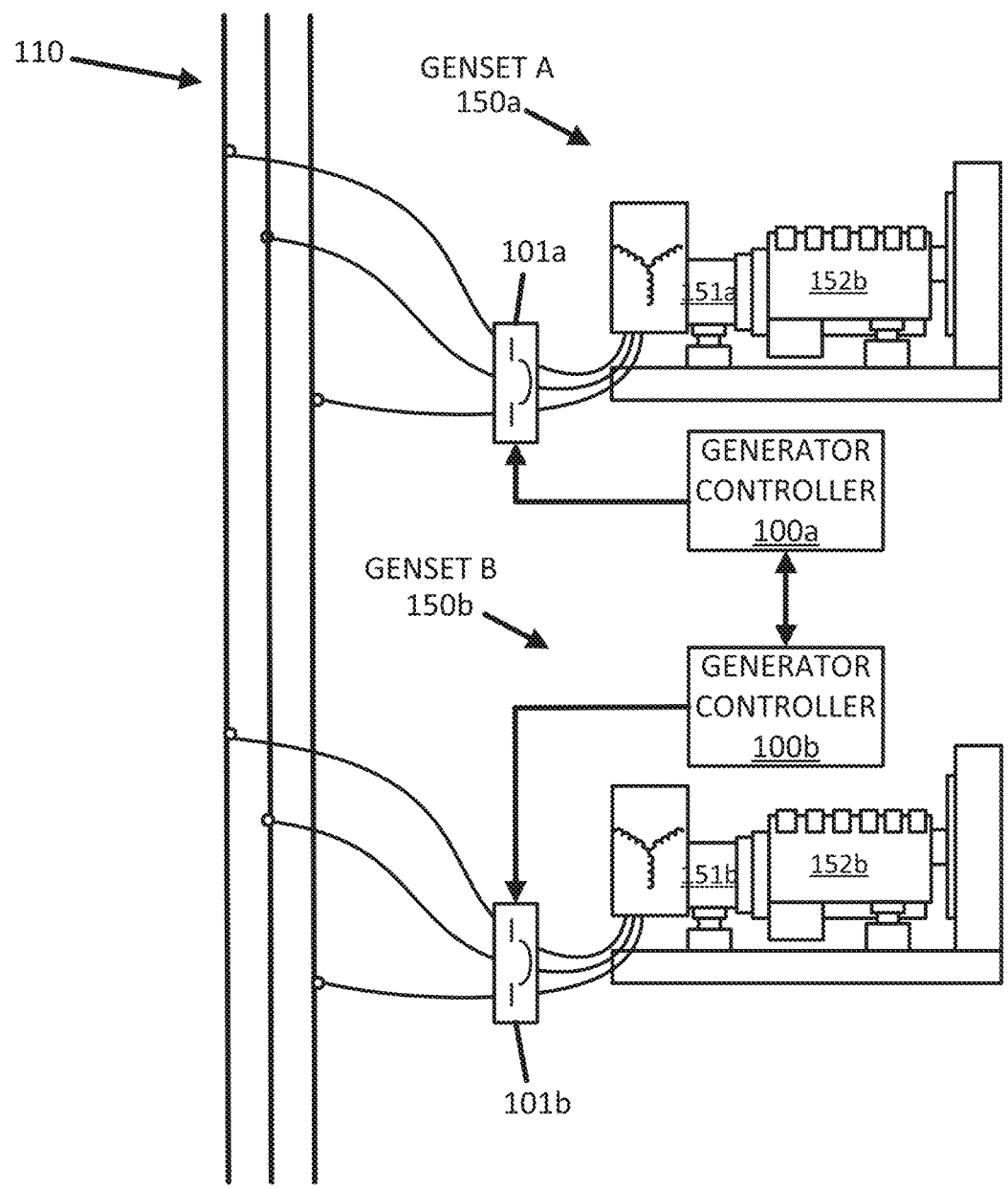
FIG. 1 illustrates an example set of parallel generators.

In electric power generators, synchronization is the process of matching the amplitude, frequency, phase angle and phase rotation or sequence (in the case of multi-phase generators) of two or more generators connected in a network such as coupled to an electrical grid of a vehicle, a ship, a building or a utility. These quantities may be naturally matched by specific operating characteristics of the generators, passively matched by intentional behavioral configuration of the generators, passively matched relying on chance variation, or actively matched based on control of the speed or voltage output of the generator.

If the voltage, frequency, phase and phase rotation are not matched before a generator is connected to another source, such as a generator, a paralleling bus, a utility, or even a large rotating synchronous motor, damage to the system may result. Control systems for paralleling generator systems are designed to reduce this possibility of damage by verifying that the generator is in synchronism with the other source before connecting the sources together electrically. Connecting the sources together can be accomplished by closing a circuit interruption device, such as a circuit breaker, a contactor, a vacuum fault interrupter, a semiconductor component, a knife switch, or other means of making or breaker electrical continuity.

The voltage amplitude of the generator is controlled by the voltage regulator on the generator, which is typically an automatic voltage regulator. The voltage frequency of the generator is determined by the rotating speed of the generator for a synchronous machine or permanent magnet machine and by the rotating speed and load for an induction machine. Paralleling applications typically use synchronous machines due to simplicity of output voltage control. The phase between two waveforms will change if they oscillate at different frequencies, effectively relating to the integral of the difference in frequency between the sources. Frequency and phase are matched by adjusting the target speed of the generator, while voltage amplitude is matched by adjusting the target to the automatic voltage regulator for the generator.

A simple example of a paralleling technique includes the following procedure for connecting two generators to a paralleling bus. The generators are both started. The first generator to reach rated speed and voltage is connected to the paralleling bus using a circuit breaker, supplying the bus with voltage produced by the generator and thereby energizing the bus. Next, the other generator reaches rated speed and voltage. The speed may be the known synchronous speed of the first generator or based on a measurement from the electrical grid. A paralleling control system measures the voltage amplitude, frequency, phase and phase rotation of the paralleling bus, verifies that the generator phase rotation matches that of the bus, and adjusts the generator speed and voltage targets until the amplitude and frequency of the generator match that of the paralleling bus and the generator lies in phase with the paralleling bus. These quantities must match within an acceptable window for the generator to be considered as 'in synchronism' with the paralleling bus.

In the example paralleling technique described above, one generator must connect to the paralleling bus, energizing it, before another generator is able to synchronize to it because the generators perform synchronization by measuring the signals from the paralleling bus, which will not be representative of the output of the first generator until the first generator has connected to the paralleling bus.

In some conditions, the paralleling bus may have load connected to it when the first generator closes. When the first generator energizes the paralleling bus, it also energizes the load, demanding power from the generator set. This load may be more than a single generator in the paralleled generator system is able to support. In this condition, it may be necessary for some of the load to be temporarily disconnected from the paralleling bus to allow the first generator to remain within acceptable operating conditions when first connecting to the paralleling bus.

In addition, devices connected to a paralleling bus may operate with a substantially constant load demand or may change their load demand over time. The change may occur slowly, quickly or suddenly. Devices which remain substantially constant may include safety lighting, air handlers, computer systems, security systems and control equipment. Devices that may change their load slowly include fans, industrial processes, people movers and gradual-start or location aware lighting systems. Devices that may change load quickly include chillers, fans, air conditioners, industrial processes, pumps, compressors, elevators and conveyors. Devices which can change their load suddenly include large-scale lighting, heating systems and induction ovens.

If the load on a generator changes significantly, the generator may experience a disturbance in output voltage and frequency. If the generator is connected to the paralleling bus and the load is also connected to the paralleling bus, variations in the load demand may result in variations in the frequency or voltage of the paralleling bus. If a generator is attempting to synchronize to the paralleling bus, variations in the paralleling bus frequency and voltage may increase the difficulty of synchronizing to the paralleling bus. If the quick or sudden load changes constitute a substantial portion of the load on the generator or generators supplying the paralleling bus, synchronizing additional generators to the paralleling bus may require adjustments to the speed and voltage beyond the rate that the controls are able to achieve.

In some applications, connecting a minimum number of generators to the paralleling bus within a minimum time is considered necessary. Some examples of these applications include data centers, hospitals, health care facilities, casinos, shopping centers, water treatment facilities, utility power stations, and apartment buildings. These applications expect guarantees with reasonable certainty that enough generators will be operating and connected to the load through the paralleling bus within the minimum time. This minimum time includes the start time of the generator and the synchronization time of the generators Providing guarantees regarding synchronization time may involve as little as a statistical understanding of the synchronization time of the generator from a variety of initial starting conditions and operating conditions of the generator or generators synchronizing to the paralleling bus, a variety of operating conditions for the generators connected to the paralleling bus, and of the load. Under conditions where the load is changing significantly, the resulting standard deviation of the synchronization time may cause the maximum time at a desired certainty to exceed the minimum time to provide power to a load. In some cases, the mean synchronization time may lie above the required time to synchronize enough generators. In these cases, providing guarantees regarding a synchronization time may be difficult while the load is being supplied by the generators connected to the paralleling bus.

To improve the repeatability of the generator synchronization process, a disconnecting device, often called a generator tie or generator main, may be provided to disconnect the paralleling bus from the varying load. The disconnecting device may be an automatic transfer switch (ATS), a circuit breaker, a contactor, a vacuum fault interrupter, a knife switch, or another circuit disconnecting device. The disconnecting device may be controlled to open when the generators start and to close only after a certain number of generators or an adequate generator capacity is connected to the paralleling bus.

If a disconnecting device is provided, the disconnecting device may require a control system to determine appropriate times to connect or disconnect the disconnecting device. In addition, the disconnecting device may support the entire load of the paralleling generators of the system, potentially requiring a very large or high-current device to perform this function. As an example, a paralleling generator system with four 2 MW generators operating at 480V may provide 3,000 A per generator, requiring 3,000 A circuit breaker for each generator, but requiring a 12,000 A circuit breaker for the generator main disconnecting device. A 12,000 A circuit breaker may be larger, more expensive, and more difficult to source than a 3,000 A circuit breaker.

If an automatic transfer switch is used as the disconnecting device, additional controls may be necessary to facilitate appropriate timing to allow for adequate capacity without excessive delay. In cases where multiple automatic transfer switches are fed by a common paralleling bus, each automatic transfer switch may require unique logic or add to the complexity of the logic to determine timing.

Generators configured to operate in parallel typically include a disconnecting device to permit selective connection/disconnection from the paralleling bus to allow for fault conditions and to remove from service for maintenance. Such disconnecting devices are typically rated to support and interrupt the rated output of the generator.

An alternate paralleling technique performs synchronization of generators with each other without one of the generators connecting to the paralleling bus feeding the load. This can be performed in a variety of ways. Paralleling the generators without connecting one to the paralleling bus feeding the load allows synchronization under consistent and repeatable conditions and reduces the effect of load variations on synchronization of the generators.

One way to synchronize generators without connecting to the paralleling bus is to provide a secondary paralleling bus, not connected to the load, to connect all the generators to, then close the generator breakers to the paralleling bus connected to the load. A secondary paralleling bus may be provided by a small, low current wiring that connects between the generators, closing a contactor or relay to energize the secondary paralleling bus, and synchronizing to the measured signal on the paralleling bus.

Another way to synchronize generators without connecting to the paralleling bus is to connect the output of each generator to the sensing on another generator. This allows each generator to synchronize to one of the other generators, potentially allowing all generators to reach synchronism.

Yet another way to synchronize generators without connecting to the paralleling bus is to provide an attenuated or modified signal relating to the output voltage of a generator to the paralleling controller of a different generator, allowing determination of the amplitude, frequency if the other generator and determination of the phase between the two generators. This signal may be via digital or analog communication. This signal may be communicated over a single interface or multiple interfaces.

Still another way to synchronize generators without connecting to the paralleling bus is to provide timing and amplitude information over an existing medium. Examples of this medium include but are not limited to a paralleling bus, a communication network, and wireless communication. For example, a low amplitude but representative signal may be applied to the paralleling bus to allow measurement of generator output characteristics to exchange enough information to support synchronizing by other generators.

As an alternative to synchronizing generators without connecting to the paralleling bus, generators may be connected to the paralleling bus early in the start sequence of the paralleling generator system. This forces the generators to match output voltage and frequency by exchanging real and reactive power between the generator sets as they start but may provide ability to accept full power within a minimum time.

Connecting generators early in the start sequence may require that the generators all start at similar times, that all generators successfully start, that no generators have opposite orientation while starting, and that none are accelerating differently. Connecting generators early in the start sequence may not reconnect all generators to a paralleling bus if some of the generators are already running.

Connecting generators early in the start sequence may limit the voltage amplitude increase rate to prevent excessive currents. Limiting the voltage amplitude increase rate may extend the time required for the generator system to reach rated voltage and frequency. Residual magnetism in a recently-operated alternator may cause different behavior when connecting generators early in the start signal as compared to generators that have not operated recently.

Some loads may be sensitive to non-standard voltage and frequency in the incoming power supply. Such loads may be damaged or degraded when subjected to a slow increase of voltage and frequency caused by connecting generators early in the start sequence.

Another example for providing timing and amplitude information over an existing medium involves applying a digital communication signal to the paralleling bus using power line carrier technology. The digital communication signal may contain amplitude and timing information that allows paralleling controllers to synchronize generators together before connecting the generator output to the paralleling bus and thereby the load.

Another example for providing timing and amplitude information over an existing medium involves utilizing a communication network already providing load sharing and first-on negotiation between paralleling controllers operating generators in a paralleling system to provide additional amplitude and timing information that allows paralleling controllers to synchronize generators together before connecting the generator output to the paralleling bus and thereby the load.

When generators utilize an alternate technique to synchronize without connecting to the paralleling bus and thereby the load, they may synchronize incorrectly due to wiring errors relating to the connection of the method that provides timing and amplitude information or wiring errors in the sensing connections on the output of the generator or for sensing the bus voltage. If the paralleling controller supports both connecting a single generator to the paralleling bus and synchronizing without connecting to the paralleling bus, it may be possible to detect such wiring errors and to reduce the possibility of damage due to connecting two generators when not synchronized.

One example technique for detecting wiring errors involves comparing the amplitude and timing information received from another generator with the amplitude and timing information measured locally from the paralleling bus when another generator is connected to the paralleling bus, then ensuring that the local metering from the paralleling bus matches metering from the local generator output when a generator is connected to the paralleling bus.

Once generators are synchronized without connecting to the paralleling bus, the disconnecting device that allows selective connection to the paralleling bus and thereby the load may be connected (closed). If a single generator connects to the paralleling bus and load, the frequency and voltage of that generator will dip significantly, potentially resulting in a loss of synchronism with the other generators. If this occurs, the other generators will have to synchronize again, which will follow a very similar procedure to a typical paralleling system startup operation. In addition, the generator may be unable to support the load, or the load may fluctuate enough to make synchronization slow or impossible.

One technique to ensure that synchronism is retained when connecting a generator to the paralleling bus is to provide a mechanism that works to coordinate the connection of all generators to the paralleling bus simultaneously. This mechanism may allow the generators to accept the load connected to the bus as a combined unit and may provide similar performance to a single generator with a rating matching the combined rating of the generators connecting to the paralleling bus.

The mechanism that works to coordinate the connection of all generators to the paralleling bus simultaneously may be a controller that receives the voltage from all generators in the system and issues a connection command to all disconnecting devices for generators which are synchronized with each other. The connection command may cause the disconnecting device to connect the generators to the paralleling bus.

The mechanism that works to coordinate the connection of all generators to the paralleling bus simultaneously may be a digital or analog signal passed to or between the paralleling controllers for each generator in the generator system once all or an adequate number of generator sets are in synchronism. Each paralleling controller for the generator sets may issue a connection command upon receipt of the signal.

The mechanism that works to coordinate the connection of all generators to the paralleling bus simultaneously may be a communication message negotiated between the paralleling controller for each generator in the paralleled generator system. This communication signal may contain a time reference and a delay time from the reference at which a connection command is to be issued. Each paralleling controller for the generator sets may issue a connection command after the delay time has elapsed from the time reference.

When all generators connect to the paralleling bus, they may be providing power to the load. In some cases, the load may be a normal load. In other cases, the load may be a short circuit condition. In still other cases, the generators may close out of synchronism due to incorrect wiring connections between the generators.

The output waveforms of the generators may exhibit different behavior depending on the load and the wiring connections between the generators. When accepting a large load, the generators may dip in voltage and frequency before recovering to a nominal target. When connecting to a short circuit, the generators may all provide similar current through the circuit. When connecting out of phase, the generators may source and absorb current between them.

If the generators are feeding the load or supplying a short circuit, the expected behavior for the paralleling generator system may be to behave similarly to a single generator, meaning that the generators remain connected to the load for some time. If the generators are connecting out of phase, the paralleling generator system may be expected to identify the wiring error and to report this to a user or concerned party before disconnecting from the bus. The incorrectly-wired generator may then be expected to synchronize to the live bus if possible.

To detect the differences in the conditions, the generators may exchange information regarding the amplitude, frequency and phase of an output characteristic of the generator. As an example, the generator may exchange amplitude, frequency and phase information relating to the current output from the generator.

In cases where the generators are feeding similar current to a load or short circuit or fault, one or more of the characteristics of the waveforms should be similar. As an example, the phase of the current on phase A of a first generator should match the phase of the current on phase A of a different generator.

In cases where the generators are exchanging current between them due to incorrect wiring, one or more characteristics of the waveforms may be different. As an example, if a first generator and a second generator connected when 120° out of phase due to the wiring being shifted, the current on phase A of the first generator may be inverse or nearly inverse of the current on phase A of the second generator. This difference in phase may be used as an indicator of incorrect wiring and enable notifying of the user or concerned party.

FIG. 1 illustrates an example paralleling generator system with two generators 150a, 150b feeding a paralleling bus 110 feeding a load. The generators 150a, 150b are comprised of engines 152a, 152b and alternators 151a, 151b which are turned by the engines 152a, 152b. The output from the generators 150a and 150b is an AC output from the alternators 151a, 151b. The outputs are selectively connected to the paralleling bus 110 are motor operated breakers 101a, 101b.

The alternators 151a, 151b may generate an output according to a field current. The field current is generated from an exciter armature or another current source. As the exciter armature rotates, voltage is induced in its coils from exciter windings or permanent magnets. The main portion of the alternators 151a, 151b generates an output in response to, and at least in part related to, the field current. Other variations of the alternators are possible.

The generator controller 100a may control both the protective functions of the generator 150a as well as the regulation of the voltage of the alternator 151a and the control of the speed of the engine 152a. In addition, the generator controller 100a may also contain the function of a paralleling controller for generator 150a, synchronizing and performing load sharing with other paralleled generators, such as 150b. The paralleling controller contained in the generator controller 100a may also control the opening and closing (disconnecting and connecting) of the motor operated circuit breaker 101a.

The generator controller 100b may control both the protective functions of the generator 150b as well as the regulation of the voltage of the alternator 151b and the control of the speed of the engine 152b. In addition, the generator controller 100b may also contain the function of a paralleling controller for generator 150b, synchronizing and performing load sharing with other paralleled generators, such as 150a. The paralleling controller contained in the generator controller 100b may also control the opening and closing (disconnecting and connecting) of the motor operated circuit breaker 101b.

The control link 104 between generator controller 100a and generator controller 100b may be a digital communications link, analog load sharing lines, physical voltage signals, or some combination thereof. The control link may negotiate a single generator to connect to the paralleling bus, allow synchronization of multiple generators before closing to the paralleling bus, and allow a mechanism that works to coordinate simultaneous closure of motor operated circuit breakers 101a and 101b. Additional, different, or fewer components may be included.

During a start sequence, the generator 150a and/or generator 150b may be started running. The generator controller 100a may generate a timing signal indicative of a waveform reference point in the output of the alternator 151a. The waveform reference point may be a time interval between a reference time and the zero-crossing point of the output of the alternator 151a. The generator controller 100a may transfer the timing signal to the generator controller 100b. After receiving the timing signal, the generator controller 100b may provide adjustment to the speed or voltage of generator 150b according to the timing signal. Adjusting the speed or voltage of the generator 150b may allow matching of an internally measured timing signal, such as the time interval between a reference time and a zero-crossing point of the output of alternator 151b. If the generator 150b has not been started, the generator controller 100b may start generator 150b in response to the timing signal.

In another example, the generator 150a and the generator 150b each directly measure the output voltage from the other generator. Generator 150a receives a signal indicative of the output of generator 150b and generator 150b receives a signal indicative of the output of generator 150a. The generator controller 100a may then monitor the output of the generator 150*b* and determine when a reference point such as a zero crossing has occurred. In a system of three or more generators, for example, a first generator may measure the output of a second generator, a second generator may measure the output of a third generator and a third generator may measure the output of the first generator. Other combinations are possible.

At a prescribed time, such as when the reference point is detected at the same time on all generators, all the generators connect to the paralleling bus 110, further illustrated and described with regard to FIG. 2 below.

In some examples, after receiving the timing signal, the generator controller 100*a*, 100*b* determines one or more compatible closing times for breaker 101*a* and 101*b* to close to bus 110. The one or more compatible closing times may be the next waveform reference point or a subsequence waveform reference point. The one or more compatible closing times may include an arbitrary point in time, a time reference passed over the communication interface, or a point in time selected using another technique. The generator controller 100*b* may return the one or more compatible closing times in a signal to the generator controller 100*a*.

In other examples, after receiving the timing signal, the generator controller 100*b* generates a confirmation signal that is returned to generator controller 100*a*. In response to the confirmation signal, the generator controller 100*a* may determine the one or more compatible closing times for breaker 101*a* and 101*b* to close to the bus 110. The generator controller 100*a* then communicates the one or more compatible closing times to generator controller 100*b*.

In response, in either example, both the generator controller 100*a* and the generator controller 100*b* instruct the breaker 101*a* and the breaker 101*b*, respectively, to close to bus 110 simultaneously, or at substantially the same time (e.g., within 10 ms or 5 ms, or within a cycle of the output of the alternators).

Figure 2:
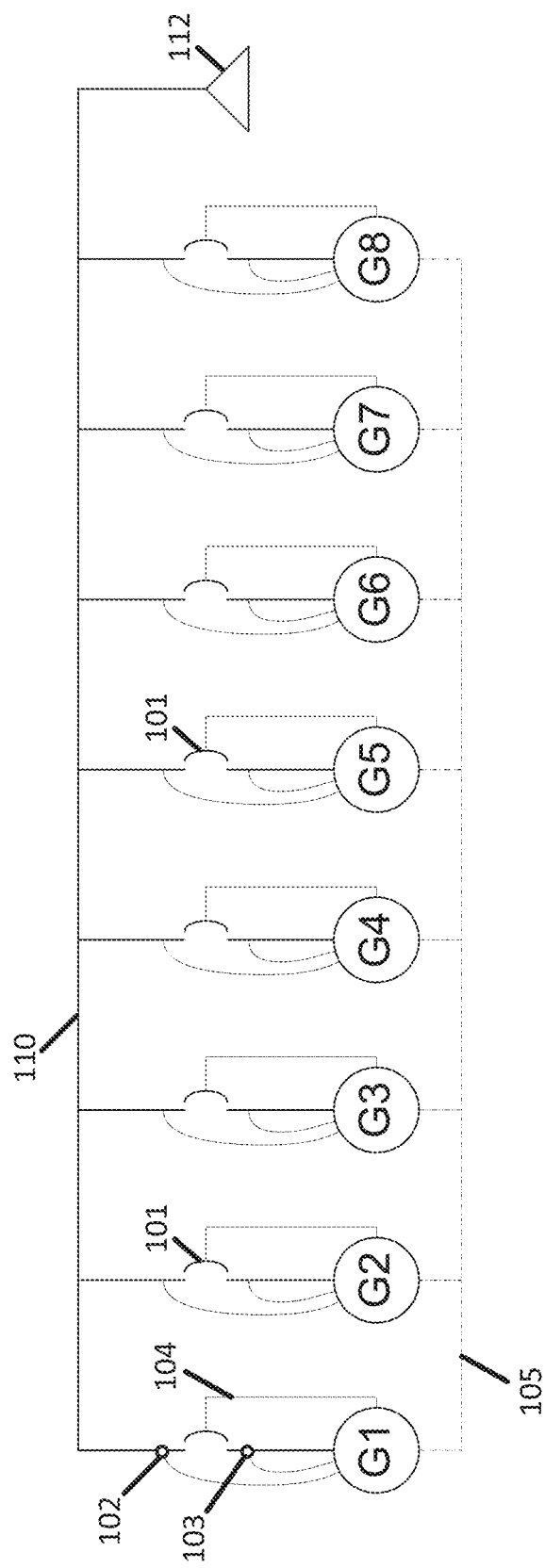
FIG. 2 illustrates another example set of parallel generators.

FIG. 2 illustrates a paralleling system with 8 generators 150. Each of the generators 150 is controlled by one or more controllers for voltage regulation, engine speed governing, generator protection, and paralleling control (not shown for ease of illustration). The paralleling controller for each of the generators measures the generator amplitude, frequency and phase using the generator voltage sensing 103 and the paralleling bus 110 amplitude, frequency and phase using the bus voltage sensing 102. The paralleling controller for each generator 150 also controls the motor operated circuit breaker 101 associated with the generator using the breaker control lines 104.

The generators 150 may exchange loading information, timing information, sequencing information, amplitude information, configuration or other type of information over the communications link 105. The Communications link 105 may be a digital communications network, such as RS485, CAN or Ethernet. The communications link may be an analog signal (such as a voltage signal from the output of the generator. The communications link may also be wireless or transmitted over existing cabling such as the power line or bus metering connection 102 using power line carrier or another technology. Any number of generators may be included in this generator system.

Each of the generator controllers may be connected to one or more sensors or detection circuits and provide one or more control signals. An example control signal is provided by the breaker control path 104 for instructing the breaker 101 to open or close. The breaker may be controlled using a relay or another type of switch. The breaker may be replaced by any type of disconnecting device, including a contactor, relay, vacuum fault interrupter, or knife switch. The breaker 101 may provide a connection between the generator 150 and the load 112 when closed. The load 112 may include substantially constant loads, slowly changing loads, quickly changing loads or suddenly changing loads.

An example detection circuit detects an electrical parameter at the generator output 103 (e.g., the generator side of the breaker 101). Another example detection circuit detects an electrical parameter at the bus voltage sensing 102 (e.g., the bus side of the breaker 101). The detection circuit may include the sensor to generate sensor data that describes an electrical parameter between the first generator and a breaker configured to close the first generator to the bus. The electrical parameter may be voltage, current, or another value. The sensor may include a voltage sensor, a current sensor, an impedance sensor, an inductive sensor, or another sensor. The detection circuit may be a volt sensor circuit, a current sensor circuit, an impedance sensor circuit, an inductive sensor circuit, or another circuit for supporting a sensor.

Figure 3:
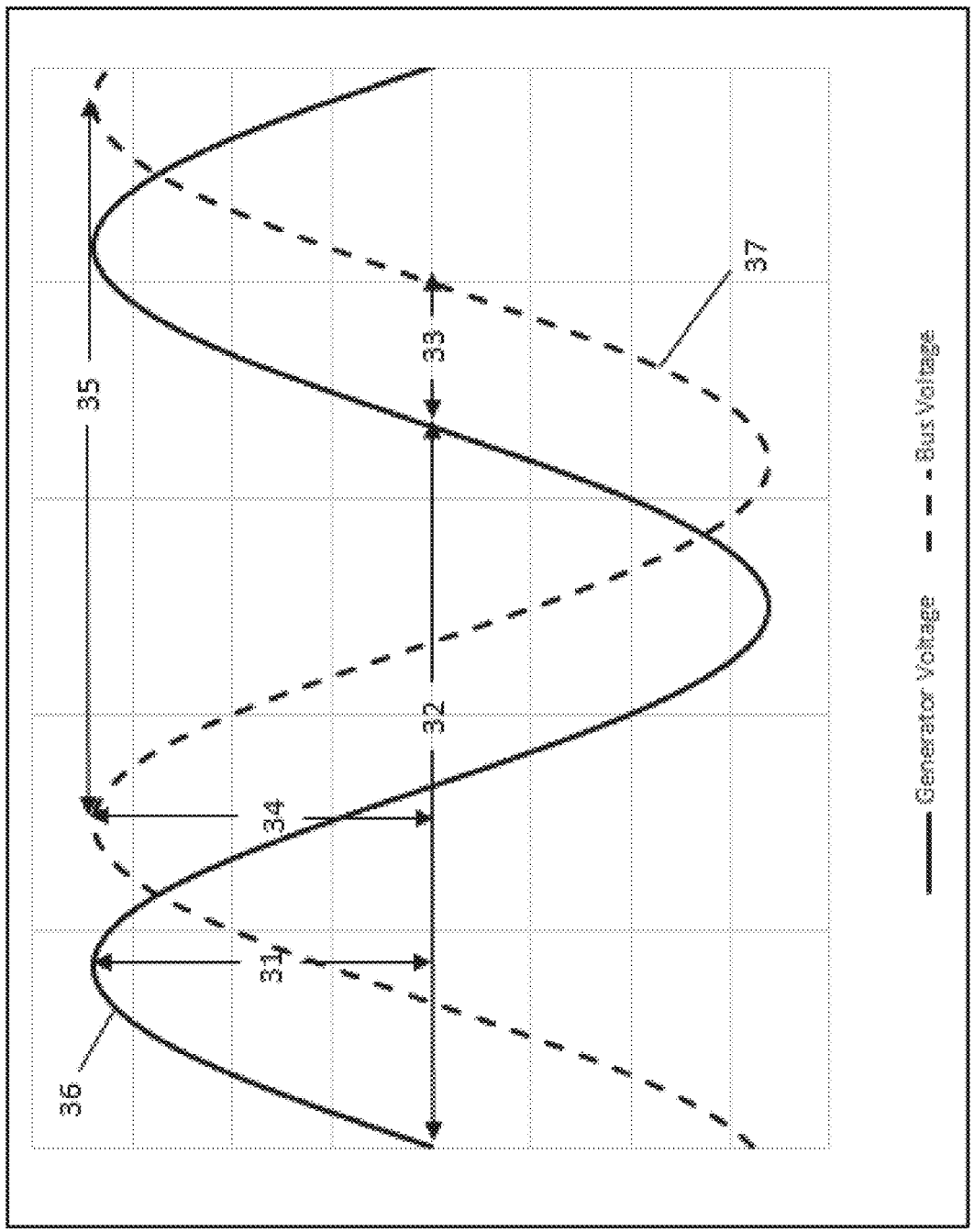
FIG. 3. illustrates an example of two waveforms and measured quantities defining the two waveforms.

FIG. 3 illustrates an example set of sinusoidal waveforms. The generator voltage 36, such as the voltage produced by a generator 150 and measured by generator voltage sensing 103, may be described by a generator voltage amplitude 31 and a generator voltage period 32. The paralleling bus voltage 37, such as present on paralleling bus 110 and measured by bus voltage sensing 102, may be described by a bus voltage amplitude 34 and a bus voltage period 35. The amplitude may be computed as a maximum value of the signal, a root mean squared (RMS) equivalent amplitude, an average equivalent amplitude of the signal, the amplitude at a given point on the signal, or another value representing the amplitude of the signal. The frequency of the signal may be computed as the reciprocal of the period of the signal.

The phase 33 between the generator voltage and the paralleling bus voltage may be represented as a time interval between rising or falling edges of the two waveforms, as a relative interval to the total period, or as a pre-defined unit, such as degrees or radians. If expressed in degrees or radians, the phase may be expressed as a phase angle, rather than a simple phase.

The phase may also be computed relative to a moment in time rather than the time when another waveform crossed zero. Referencing the phase to a moment in time may allow for computation of relative phase with other signals by subtraction. Referencing the phase to a moment in time may facilitate transmission of timing information regarding the phase of the signal over a time-referenced communication medium such as RS485, Ethernet or CAN.

The amplitude and period or frequency are ways that may describe a time varying periodic waveform, such as the voltage or current in an alternating current (AC) system. The phase or phase angle may be used to describe a relationship between two time-varying periodic waveforms. A controller may consider two signals to be identical if the amplitude and frequency of the two signals match within limits and the phase between the signals is below a limit.

Figure 4:
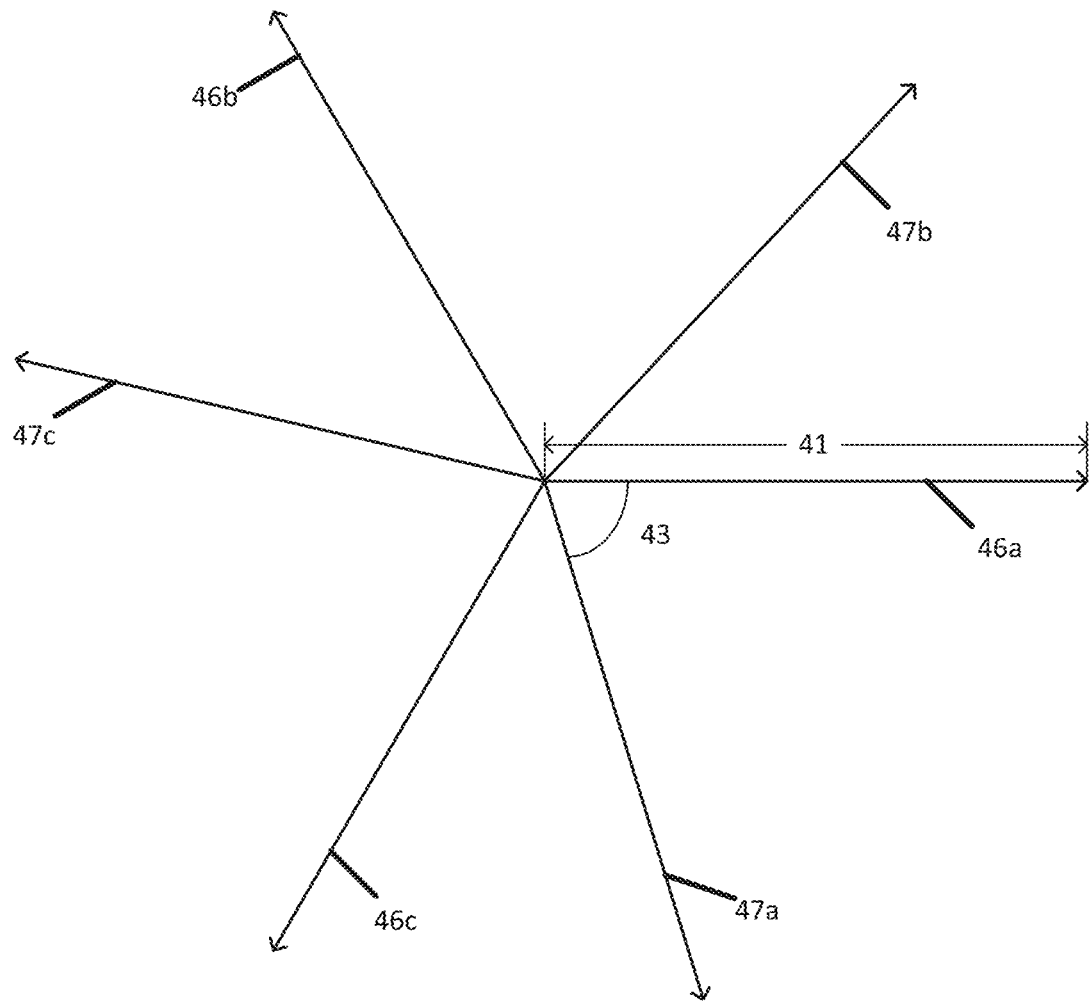
FIG. 4 illustrates another graphical depiction of two waveforms and the quantities defining them.

FIG. 4 illustrates a vector depiction of the three-phase output voltage of a generator and the three-phase voltage of a paralleling bus. The generator voltage is expressed by three voltage vectors, 46*a*, 46*b* and 46*c*. The paralleling bus voltage is expressed by three voltage vectors, 47*a*, 47*b* and 47*c*. The amplitude of each phase voltage is depicted as the magnitude of the associated vector. For example, generator voltage amplitude A 41 is depicted as the amplitude of vector 46*a*.

The generator to bus phase angle 43 is depicted as the phase angle between the generator voltage A 46*a* and the paralleling bus voltage A 47a. Similar comparisons may be made between the generator voltage B 46b and the paralleling bus voltage B 47b or the generator voltage C 46c and the paralleling bus voltage C 47c.

The vectors 46a, 46b and 46c illustrate an ABC phase rotation. A phase rotation indicates the phase sequence of the voltage vectors. An ABC rotation may indicate that phase A occurs before phase B and after phase C. A CBA rotation may indicate that phase A occurs after phase B and before phase C. A phase rotation may be characterized by monitoring the phase angle between generator voltage A 46a and generator voltage B 46b and comparing it to an expected value, such as 120°. A phase rotation may also be characterized by comparing other combinations of vectors 46a, 46b and 46c to other or similar expected values. Additional signals may be measured to determine phase rotation.

The vectors 47a, 47b and 47C also illustrate an ABC rotation for the paralleling bus. The paralleling bus phase rotation may be determined by an identical, similar or different technique to the determination of the generator phase rotation. More or fewer signals may be monitored for the paralleling bus to determine phase rotation.

Phase rotation may determine the direction that attached motors spin. Some rotating loads, driven by motors, only operate properly when rotating in one direction. In addition, phase rotation may determine which direction a generator is expected to spin. Connecting a generator to a paralleling bus with opposite rotation may result in damage to the generator or other generators connected to the paralleling bus.

Figure 5:
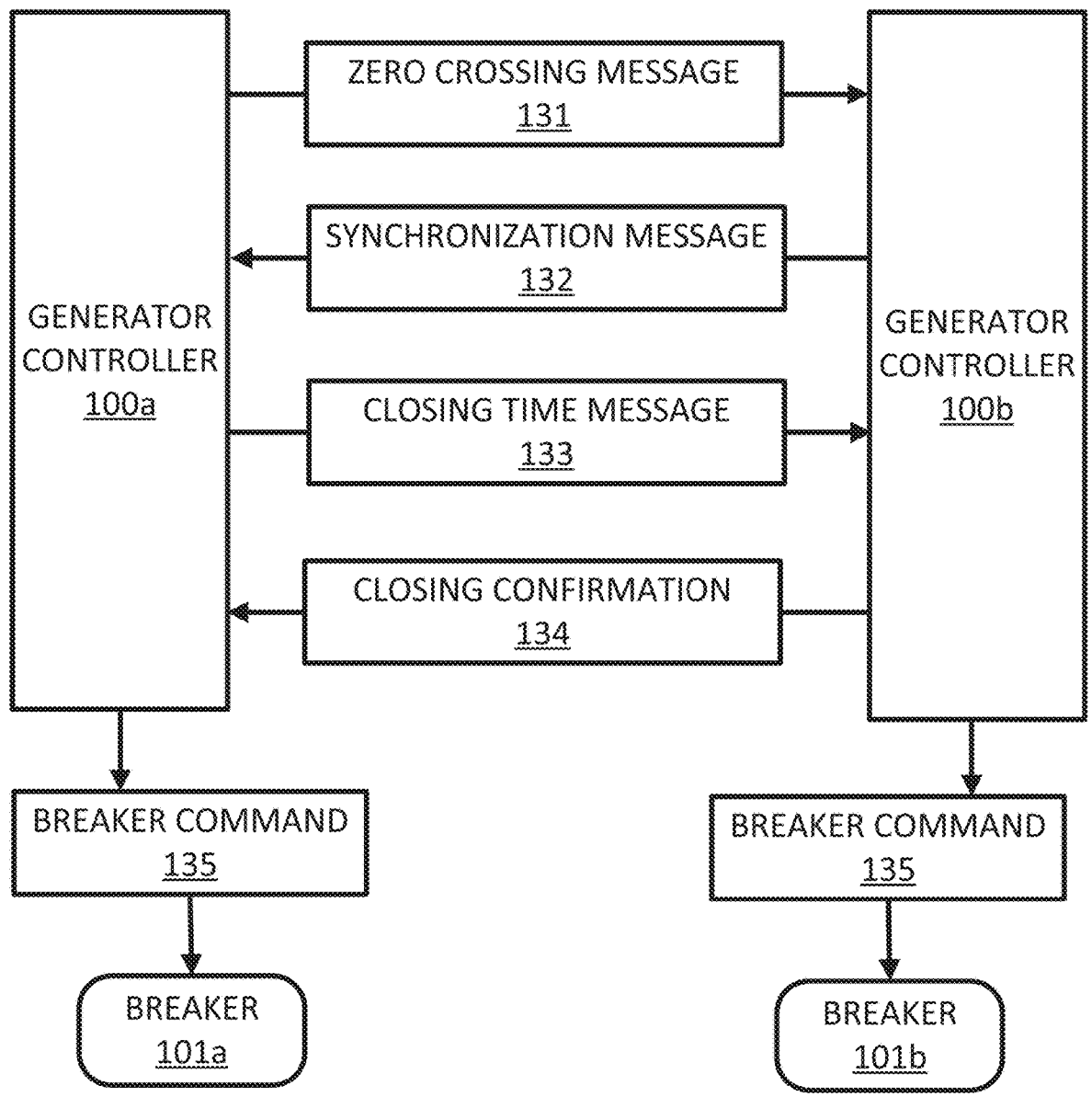
FIG. 5 illustrates an example embodiment of communication between generator controllers.

FIG. 5 illustrates an example embodiment of communication between generator controllers 100a and 100b. The communication may occur on a dedicated communication wire that extends between the generator controllers (e.g., serial cable, USB cable). The communication may occur over a wired computer network (e.g., Ethernet). The communication may be modulated to be transmitted over bus 110. In this example another communication path may be provided by the gensets and the bus 110 that bypasses the circuit breaker, or the bus voltage sensing may be utilized for communication. The communication may occur wirelessly such as a cellular network, the family of protocols known as Wi-Fi or IEEE 802.11, the family of protocols known as Bluetooth, or another protocol. Example wireless networks may include a wireless mesh network (e.g., Bluetooth mesh). The wireless mesh network many include communication between many nodes and many nodes.

The generator controllers 100a and 100b are configured to exchange messages including a zero-crossing message 131, a synchronization message 132, an initial closing timing message 133 and a confirming closing time message 134. The messages may be relayed in a variety of techniques including analog signals, digital signals, and data packets that are switched on a network or directly transferred between the generator controller 100a and the generator controller 100b. The time charts in FIGS. 6A-6C and 7A-7C provide further explanation of these messages. The charts in FIGS. 6A-6C demonstrate the generation of messages at an initiating or primary generator, and the charts in FIGS. 7A-7C demonstrate the response messages at a responding generator or secondary generator.

Figure 6A:
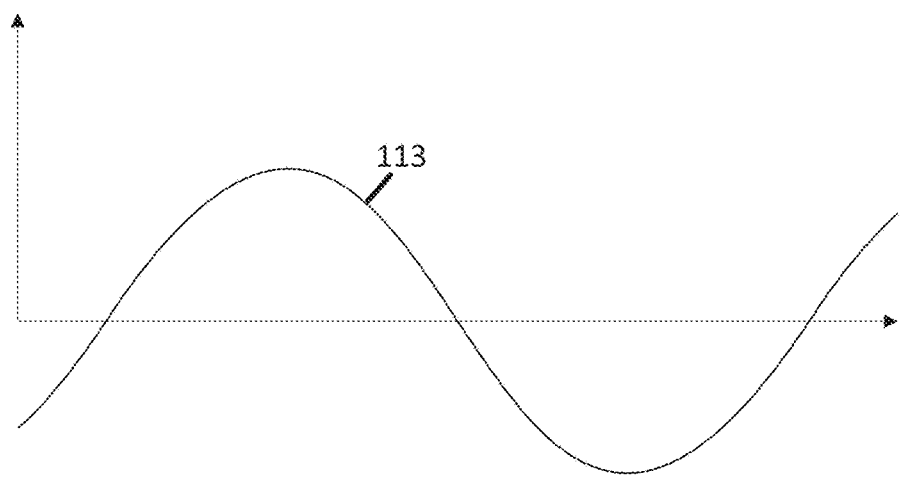
FIG. 6A illustrates an example generator output.

FIG. 6A illustrates an example generator output signal 113 for a generator (e.g., the generator 150a). The generator output 113 may be a voltage, current, or other electrical or mechanical measurement from generator output 103. The generator controller 100a may be connected to a sensor or a detection circuit and/or be configured to collect sensor data indicative of the electrical or mechanical measurement of the output of at least the first generator.

The generator controller 100a is configured to determine a reference point from the generator output signal 113. The reference point may be a reoccurring property of the signal. An example reference point is the zero-crossing, which is the time that the generator output signal 113 cross the value of zero at the horizontal axis of the chart in FIG. 4A. The time may be measured in relative or absolute scales. The time may be the time of a synchronized clock between the generator controller 100a and the generator controller 100b. The clocks may be synchronized based on the pulse from other controllers or based on a communication packet from the other controllers. The clocks may be synchronized according to a wireless network or the internet. The clocks may be synchronized according to a radio signal (e.g., AM or FM radio signal). The clocks may be synchronized according to synchronized values modulated on a power signal (e.g., utility). The clocks may be synchronized according to a satellite signal such as a global positioning system signal. Other reference points may include maxima, minima, or points at which the output signal 113 cross a predetermined value.

Figure 6B:
FIG. 6B illustrates an example chart of zero crossing times for a generator.

FIG. 6B illustrates an example digital signal indicative of the reference point in FIG. 6A. The digital signal may include a binary level or pulse width that indicates the reference point has occurred. For example, each pulse 114 indicates that a zero crossing has occurred in the generator output signal 113.

Figure 6C:
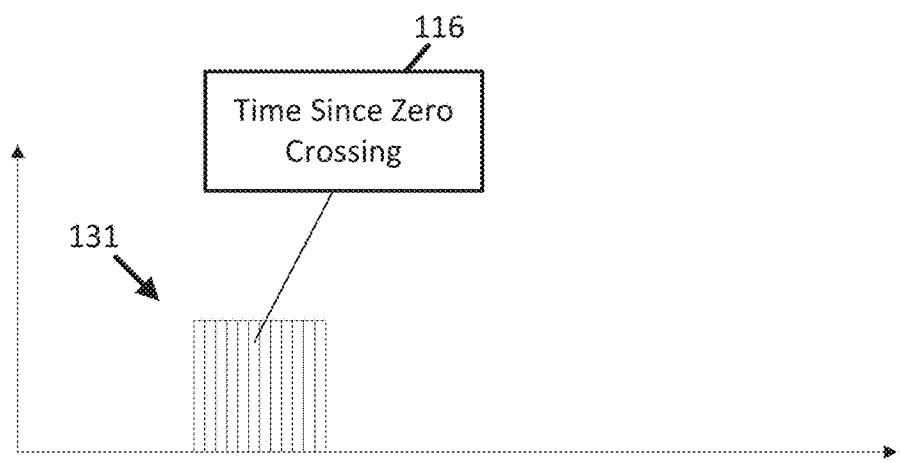
FIG. 6C illustrates an example communication for synchronization.

FIG. 6C illustrates an example communication for synchronization including the zero-crossing message 131. The generator controller 100a may generate the zero-crossing message 131 in response to the pulse 114 or as an alternative to pulse 114 in response to the reference point of the generator output signal 113. The zero-crossing message 131 may describe the time that the reference point (e.g., zero-crossing) occurred and the time between reference points. The time between zero-crossings may be the time between the most recent receive reference points detected or may be an average time between reference points over a predetermined number of reference points.

The zero-crossing message 131 may indicate the time between a coordinated time and the reference time. The coordinated time may be the start of the packet transmission. The coordinated time may be related to the pulse 114. The coordinated time may be due to another message on the same or different communication lines. The coordinated time may be received from a time controller, such as a GPS satellite or a time synchronization service.

The control signal may include a closing data message including a data field for the closing time. A data field 116 may include the measure of time between when the reference point occurred at the time of generation of the zero-crossing message 131. Alternatively, the data field 116 may include a measure of time between when the reference point occurred and the transmission of the zero-crossing message 131. The zero-crossing message 131 may include a message identifier that identifies the type of message as a synchronization message or more specifically the type of reference point such as a zero-crossing message.

The generator controller 100a may send the zero-crossing message 131 to the generator controller 100b. In response, the generator controller 100b may adjust the speed and voltage of generator 150b to match the amplitude, frequency and phase of the output of generator 150b to match that of generator 150a using the information in the zero-crossing message 131. Alternatively, both controller 100a and controller 100*b* may adjust speed and voltage of generator 150*a* and generator 150*b* to match amplitude, frequency and phase of their output waveforms.

Figure 7A:
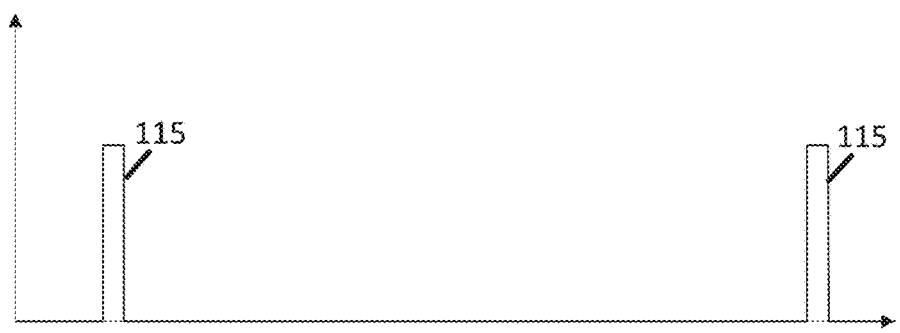
FIG. 7A illustrates an example generator output.

FIG. 7A illustrates example pulses 115 that represent one or more reference points in the generator output for the receiving generator or secondary generator (e.g., the generator 150*b*). Either the generator 150*b* has been previously started and the engine 152*b* has been brought up to speed, or the engine 152*b* is started in response to the zero-crossing message 131 or another message. The generator controller 100*b* may extract phase timing data or calculate the phase timing data based on the reference points in zero-crossing message 131. The generator controller 100*b* may adjust the phase angle of the generator 150*b* based on pulses 115 and the phase timing data. In other words, the generator controller 100*b* may determine the differences in pulses 115 for reference points in the output of the generator 150*b* and the pulses 114 for the reference position the output of generator 150*a* and adjust the frequency and therefore the period to change the timing of the generator 150*b* to be in synchronism.

The generator controller 100*b* may determine whether the output of the generator 150*b* matches the output of generator 150*a* in various electrical parameters. For example, the generator controller 100*b* may determine that the voltage amplitude of the generator 150*b* is within a predetermined range. If the voltage amplitude is not in predetermined range the generator controller 100*b* may increase the field current to the alternator 151*b* when the voltage amplitude of the generator 150*b* is lower than the predetermined voltage range or decrease the field current when the voltage amplitude of the generator 150*b* is above the predetermined range.

In addition, or in the alternative, the generator controller 100*b* may determine that the frequency of the output of the generator 150*b* is not within a predetermined frequency range. If the frequency is not in the predetermined range the generator controller 100*b* may increase the speed of the engine 152*b* when the frequency of the generator 150*b* is lower than the predetermined frequency range or decrease the speed of the engine 152*b* when the frequency output of the generator 150*b* is above the predetermined range.

In addition, or in the alternative, the generator controller 100*b* may determine that the phase of the output of the generator 150*b* is not within a predetermined phase range of the phase of the generator 150*a*. If the phase is measured as an angle, the predetermined phase range may be a phase angle range. For example, if the phase angle of the output of generator 150*b* is determined to be 50° leading relative to the output of generator 150*a*, the generator controller 100*b* may decrease the speed of the engine 152*b*, increasing the period of the output from generator 150*b* and causing the phase angle of generator 150*b* relative to 150*a* to occur later with each cycle, eventually matching the phase between the two generators. Similar methods may be used if the phase angle of the generator 150*b* is 50° lagging relative to the generator 150*a*. The speed may be increased to decrease the period for each cycle and eventually match the phase of generator 150*b* with generator 150*a*.

The generator controller 100*b* may adjust the amplitude of the output of the generator 150*b* by changing the excitation current to the alternator 151*b*. The generator controller 100*b* may adjust the frequency of generator 150*b* by changing the speed of the engine 152*b*. The generator controller 100*b* may adjust the phase angle between generator 150*b* and generator 150*a* by adjusting the frequency of the output of the generator 150*b* by changing the speed of the engine 152*b*, changing the period of the signal and causing the phase to change over time.

The generator controller 100*b* may generate a synchronization message 132 in response to the zero-crossing message 131 indirectly, or in response to the adjustment of phase angle in the output of the generator 150*b*. That is, when the phase angle has been adjusted so that the phases of generator 150*b* are synchronized with the phases of generator 150*a*, the synchronization message 132 may be generated. In some examples, the synchronization message 132 may be generated after a predetermined time or number of cycles that the generator controller 100*b* observes that the phases are in synchronism. The predetermined time may be 100 milliseconds, 500 milliseconds, 1 second, or another value. The number of cycles may be 3 cycles, 10 cycles, or another value.

The synchronous message 132 may indicate that generator controller 100*b* has been synchronized with generator controller 100*a*. More specifically the synchronization message 132 may indicate that the waveform amplitude and frequency of generator 150*b* matches that of generator 150*a* within a predetermined range and that the phase angel between them or the time interval between their zero-crossing is within a predetermined range. The synchronization message 132 may include a message identifier that identifies the type of message. In some examples, no other information is included in the synchronization message 132 except the identity of the message. Receipt of the synchronization message 132 indicates that the generators are synchronized in time, or at least that the generator controller 100*b* has determined that the generator 150*b* is synchronized with the generator 150*a* based on the zero-crossing message 131.

In response to receiving the synchronization message 132, the generator controller 100*a* may generate the initial closing timing message 133 or a control signal indicative of a closing time. The closing time for the generators may be calculated in response to the timing data from generator 150*a* and the sensor data indicative of the reference point (e.g., zero-crossing) of an output of at least the second generator 150*b*.

Figure 7B:
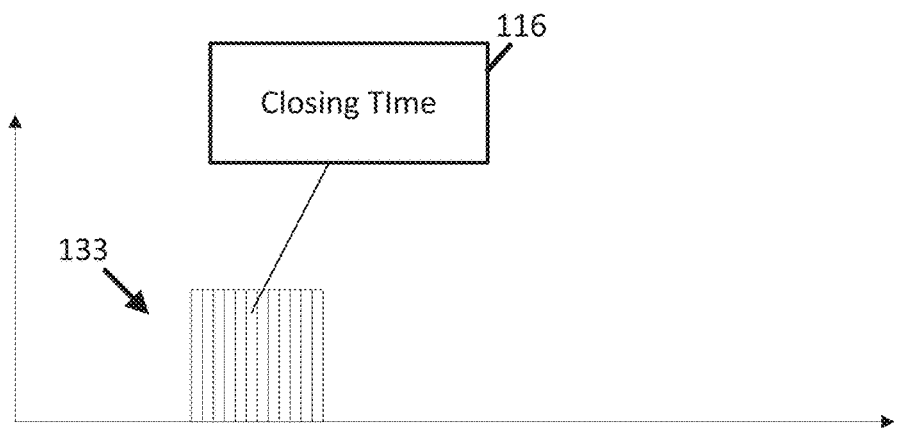
FIG. 7B illustrates an example communication for closing times for a breaker.

FIG. 7B illustrates an example packet or series of packets as the initial closing timing message 133 including a data field 116 for closing times for a breaker. The data field 116 may describe an amount of time between when the packet was sent and when the breaker 101*a* should close.

The generator controller 100*a* may generate the breaker command 135 to instruct the breaker 101*a* to close. In addition, the generator controller 100*a* may transmit the initial closing timing message 133 to the generator controller 100*b*. In response the generator controller 100*b* may generate the breaker command 135 to signal the breaker 101*b* to close at substantially the same time as breaker 101*a*. Substantially the same time may mean that the two breakers both close within a small window in time. As an example, breaker 101*a* may close 1 ms, 10 ms, 16 ms, or another short time before breaker 101*b*. As another example, breaker 101*a* may close 1 ms, 10 ms, 16 ms or another short time after breaker 101*b*.

In one example, the generator controller 100*a* may also wait for a confirmation that the breaker command 135 will be sent at the generator controller 100*b* before instructing the breaker 101*a* to close. The generator controller 100*b* may generate and send a confirming closing time message 134 that indicates to the generator controller 100*a* that the generator controller 100*b* has received the initial closing timing message 133 and is preparing to follow the instructions in the initial closing timing message 133 to close the breaker 101b. The synchronization message 132 and confirming closing time message 134 may include a message identifier that identifies the type of message as closing time messages or synchronization messages. The generator controller 100a may not wait for a confirmation and assume that generator controller 100b will instruct the breaker 101b at the time listed in the initial closing timing message 133. Thus, after sending the initial closing timing message 133 the generator controller 100a may close breaker 101a to the bus 110 at the time listed in the initial closing timing message 133.

A more detailed or different handshake or negotiation between the generator controller 100a and the generator controller 100b may occur. For example, the initial closing timing message 133 may include a range of potential closing times. The range of potential closing times may be a series of expected zero crossings or other reference points. The generator controller 100 may select one of the series of expected references points and include the selected reference point in the confirming closing time message 134.

As an alternative to the exchange of closing time messages (e.g., closing time messages 133 and the closing confirmation 134), the generators 150a and 150b may close to the bus upon synchronization. For example, the zero-crossing message 131 may also include a closing time deadline, which may be relative (e.g., in 30 seconds) or absolute (e.g., at 12:30:30). After the generator controller 100b receives the zero-crossing message 131, the generator controller 100b performs synchronization at then generates the breaker command 135 to close the bus 101b at the time proscribed by the zero-crossing message 131. Likewise, the generator controller 100a closes to the bus at the same time without any communication from the generator controller 100b. As another alternative, the closing time message 133 (to include the closing time rather than the zero-crossing message 131) is included but the closing confirmation 134 is omitted.

In other examples, the generator controller 100a may identify multiple potential closing times, include the list in the initial closing timing message 133. Subsequently, the generator controller 100a may attempt to close to the bus 110 at each of the potential closing times. The generator controller 100a may detect whether the breaker 101a or the breaker 101 for other generators have closed to the bus 110. If no generators have closed to the bus, the generator controller 100a may remove the close signal from breaker 101a and attempt to close at the next one of the potential closing times. This process may repeat for a maximum time or be repeated until the generator controller 100a determines that one or more generators have closed to the bus 110.

Figure 7C:
FIG. 7C illustrates an example communication for closing time of the breaker.

FIG. 7C illustrates an example communication for the breaker command 135 closing time of the breaker. The breaker command 135 is illustrated in time by square wave 118. The high value of the square wave instructs the breaker to close to the bus 110. The breaker command 118 may be a momentary signal maintained only until breaker 101 closure is detected or a maximum time is exceeded. The breaker command 118 may be a maintained signal held when the breaker 101 is to be closed.

Figure 8:
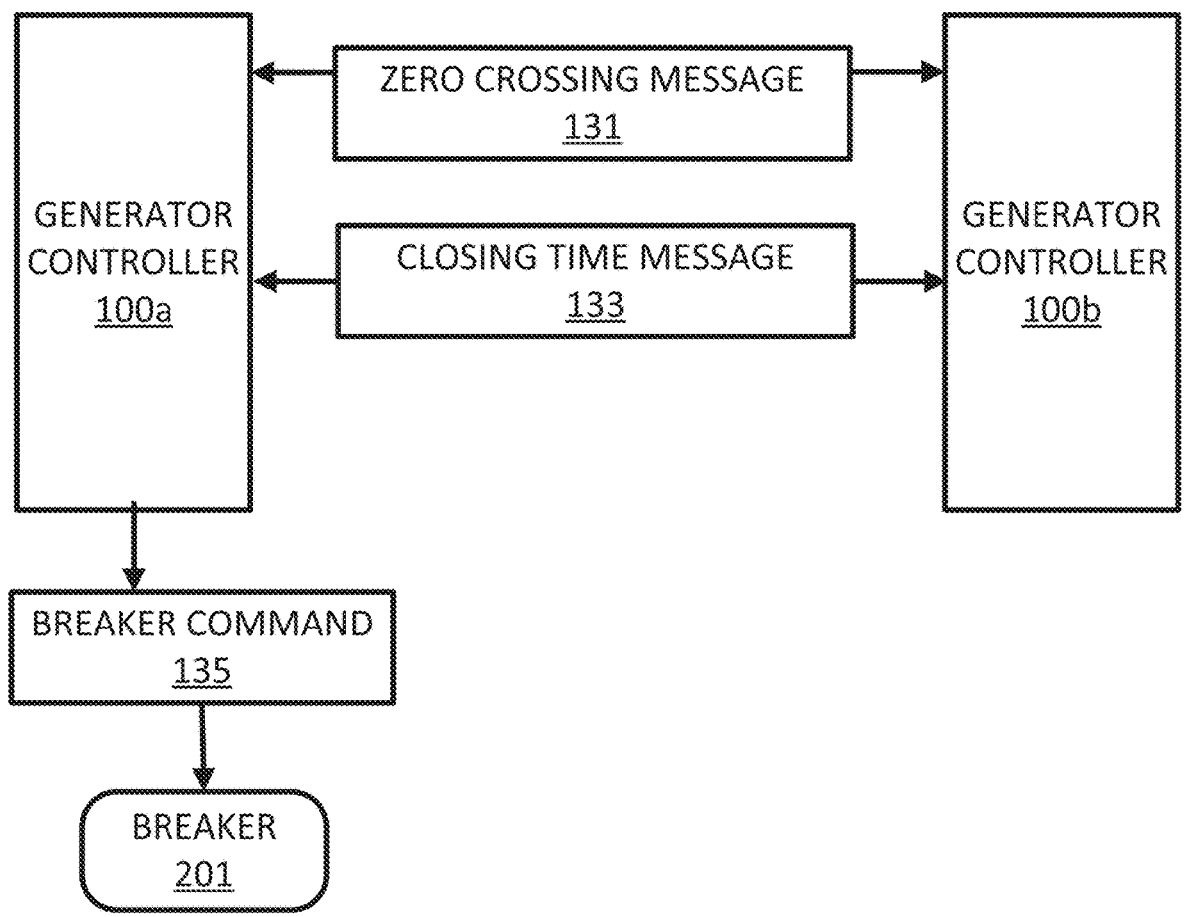
FIG. 8 illustrates an example embodiment of communication between generator controllers.

FIG. 8 illustrates another example embodiment of communication between the generator controller 100a and the generator controller 100b. This embodiment may vary in two main respects from the embodiment described from with respect to FIG. 5: (1) the number of communications or signals exchanged to perform paralleling and synchronization is reduced to two, and (2) only one of the generator controller 100a and the generator controller 100b provides the breaker command 135 to both paralleling breakers 101a and 101b. That is, only one of the controllers operates the breakers to connect both the generator 150a and the generator 150b to the bus 110. A second, redundant breaker command 135 may be provided by the other of generator controller 100a and generator controller 100b. As an example, generator controller 100a may provide the close signal to breakers 101a and 101b, but generators controller 100b may provide the redundant (backup) signal to the breakers if the signal from controller 100a does not work as expected. The controllers may operate sequentially, each providing the signal for a subsequent attempt. The controllers may operate simultaneously, with both controllers providing the signal to both breaker at the same time.

A contemplated embodiment (not illustrated) provides an additional controller to operate both breakers 101a and 101b or as many breakers 101 as are contained in the paralleling system. The additional controller ensures that breaker closure occurs simultaneously or within a short time, such as 100 microseconds.

The generator controller 100a (first generator controller) is configured to send timing data indicative of a reference point of the output of the alternator to a second generator controller. For example, the generator controller 100a may send the zero-crossing message 131 including the timing data to the generator controller 100b. The timing data may describe the output of the first generator sufficiently so that the second generator may be synchronized to the first generator.

Upon receipt of the zero-crossing message 131, the synchronization may be performed at the second generator controller 100b in response to the timing data or may be performed on both controllers 100a, 100b based on the zero-crossing messages sent by both controllers 100a, 100b. The generator controllers 100a, 100b may synchronize the generators in response to the timing data from the other generator controller 100b, 100a. To synchronize, each generator controller 100a, 100b identifies the electrical parameters, such as amplitude, frequency, and/or phase from the timing data received from the other generator controller 100b, 100a. The generator controllers 100a, 100b may adjust the electrical parameters of the generator 150a, 150b to synchronize with the other generator 150b, 150a.

The generator controllers 100a, 100b may generate the initial closing timing message 133 in response to a successful synchronization. A successful synchronization may mean the generator controllers 100a, 100b have successfully adjusted the output of the alternator 151a to substantially match that of the alternator 151b. The term substantially match may mean that a predetermined number (e.g., all) of the electrical parameters of the output of the alternator 151a are within a predetermine difference or margin of error of the electrical parameters of the output of the alternator 151b. In response to the successful synchronization, the generator controllers 100a, 100b generate and send the initial closing timing message 133 including data indicative of the confirmation of synchronization of the generators.

The initial closing timing message 133 from generator controller 100a may not be sent at the same time as the initial closing timing message 133 from generator controller 100b. In this case, the two generator controllers may both use the lowest time message from either of the controllers. The two generator controllers may also use the highest time message from either of the controllers. Alternatively, the generator controllers may always use their own synchronization timing to determine when the breaker close signal 135 is sent.

The first generator controller 100a is configured to generate, in response to confirmation of synchronization from the second generator controller, a closing time command for the second generator controller 100b. The closing time command includes a data field for the closing time. The generator controller 100a may also send a control signal including the closing time command as a least one pulse width modulated value for the closing time. In response to the closing time command, the generator controller 100b sends a close command 135 to the breakers 101a and 101b to connect generators 150a, 150b to the bus 110, and at the same time, the generator controller 100a sends a close signal to the breakers 101a and 101b to connect generators 150a, 150b to the bus 110. Any number of generators 150, circuit breakers 101 and generator controllers 100 may be included in the system.

Figure 9:
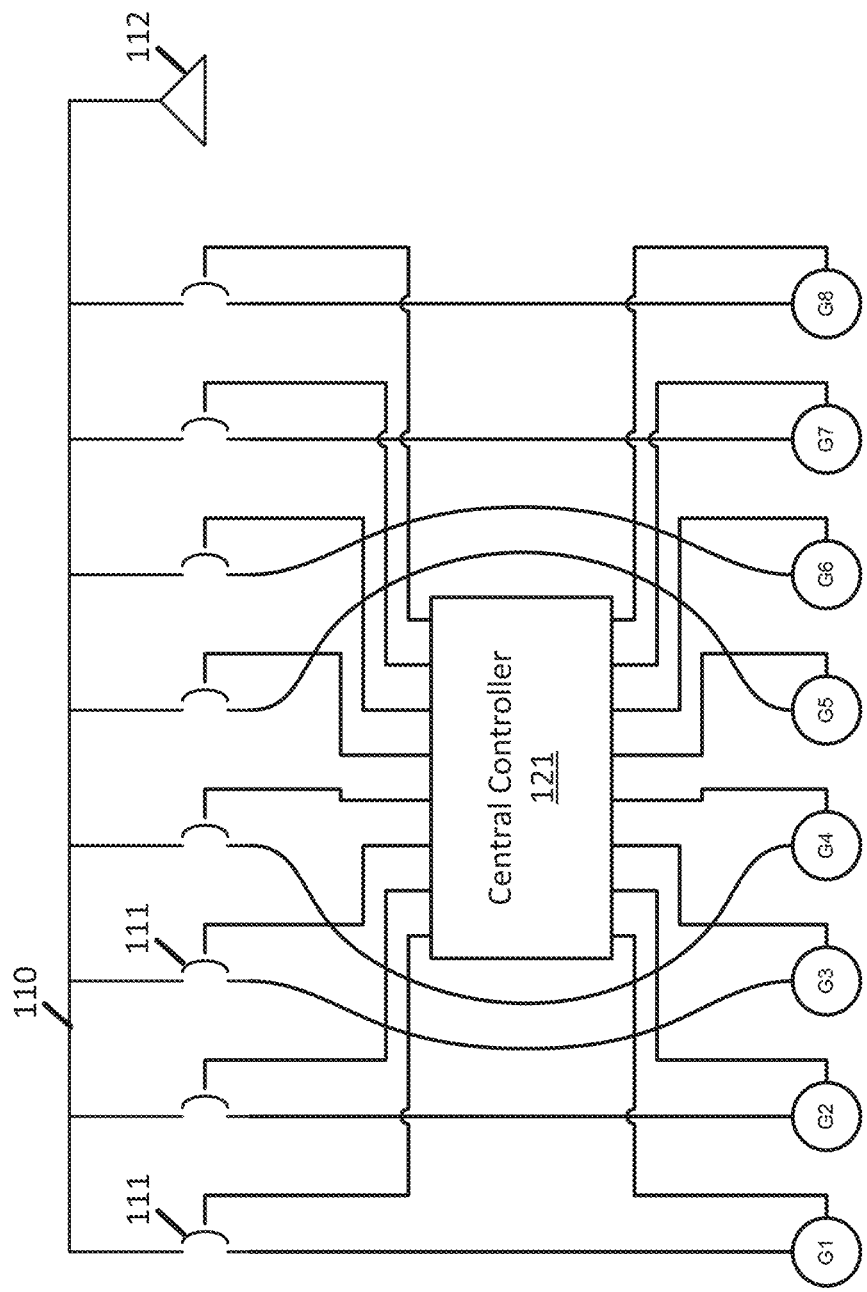
FIG. 9 illustrates an example set of generators and central controller.

FIG. 9 illustrates an example set of generators and a central controller 121. The central controller 121 may perform functions described with respect to the generator controller 100a and the generator controller 100b above. Because the central controller 121 is used, no communication between the generator controller 100a and the generator controller 100b is necessary or shown.

The central controller 121 may receive sensor data for the electrical parameters of the outputs of generators G1-G8. One of the generators is initially started or all the generators are initially started. The central controller 121 may generate timing data indicative of the reference point in the output of the initially started generator. The central controller 121 may synchronize the other generators with the initially started generator in response to the timing data. The central controller 121 may instruct the other generators to start. The central controller 121 may synchronize the other generators by adjusting the operating characteristics of the other generators to be substantially the same as the first generator. The characteristics of other generators may be a signal representing an average characteristic of the other generators. The output amplitude, frequency, engine speed, field current, or other characteristics may be modified.

Once the generators G1-G8 are synchronized, the central controller 121 calculates a closing time for the generators G1-G8 in response to the timing data. The closing time may be any arbitrary point along the waveform or any arbitrary point in time. The central controller 121 generates and sends a breaker signal to each of the breakers 111 to simultaneously connect the generators G1-G8 to the bus 110.

Embodiments are contemplated where the generator controllers 100a, 100b and the system controller 121 connect a quantity of generators 150 capable of supporting the load to the paralleling bus 110 and load 112 by closing the breakers 101. This quantity of generators may be less than the total available generators in the system. The generator controllers 100 and the system controller 121 may also connect as many generators as are synchronized to the bus 110 and load 112 after a certain time has expired, even if there are fewer generators than are required to support the load. The generator controllers 100a, 100b and system controller 121 may provide a load shed signal when all required generators are no in synchronism.

Figure 10A:
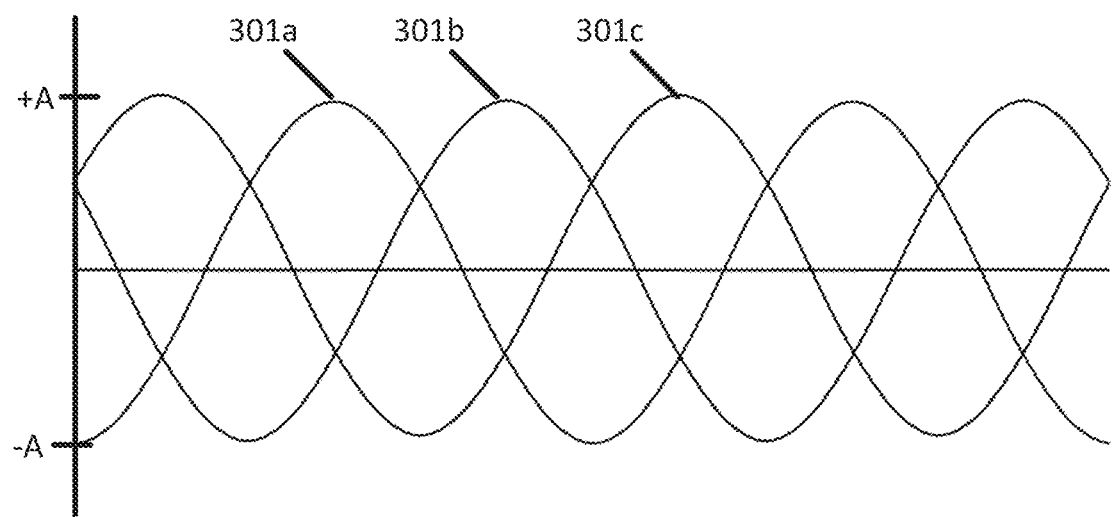
FIGS. 10A and 10B illustrates the output of the generator in a short circuit condition.
Figure 10B:
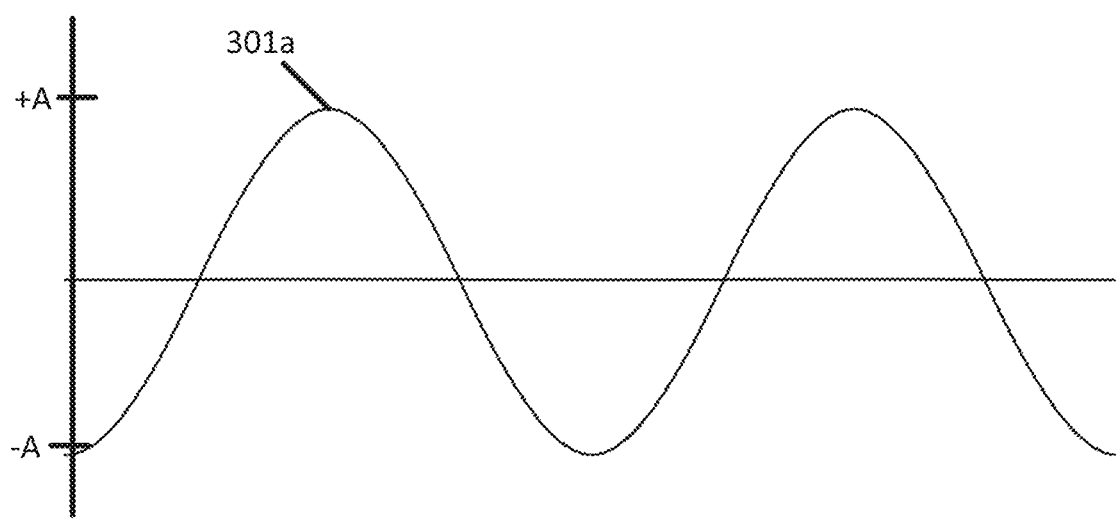

FIGS. 10A and 10B illustrate the output current of the generator in a short circuit condition. The three phases of the output of the generators in FIG. 10A include a waveform 301a that represents phase A of the first generator, phase A of the second generator, and phase A of the load, a waveform 301b that represents phase B of the first generator, phase B of the second generator, and phase B of the load, and a waveform 301c that represents phase C of the first generator, phase C of the second generator, and phase C of the load because they are all synchronized. FIG. 10B illustrates a single phase, for example, waveform 301a.

Figure 11A:
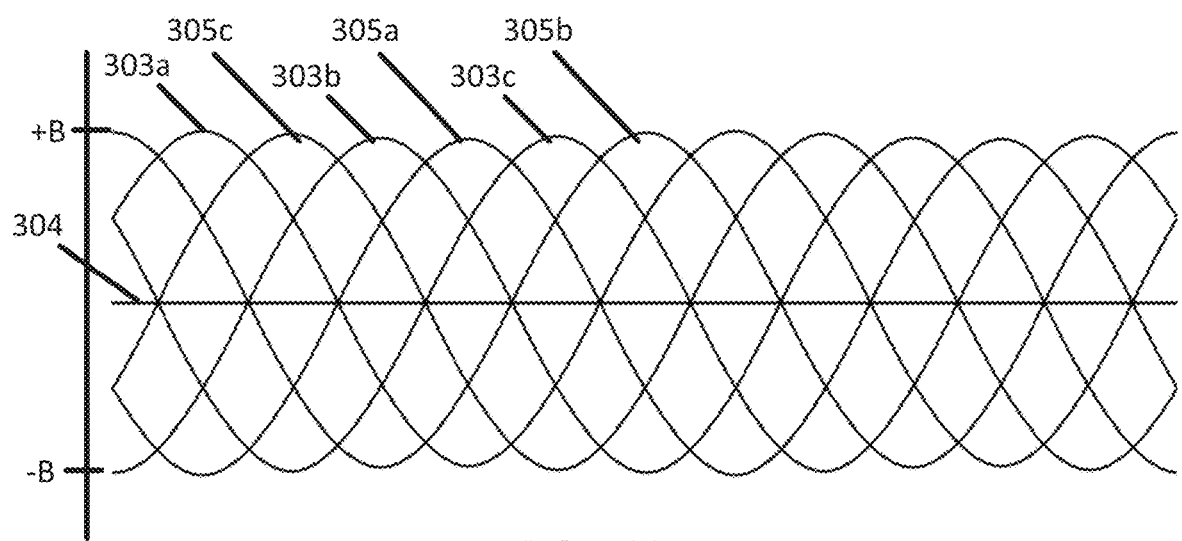
FIGS. 11A and 11B illustrates the output of the generator in an open circuit condition.
Figure 11B:
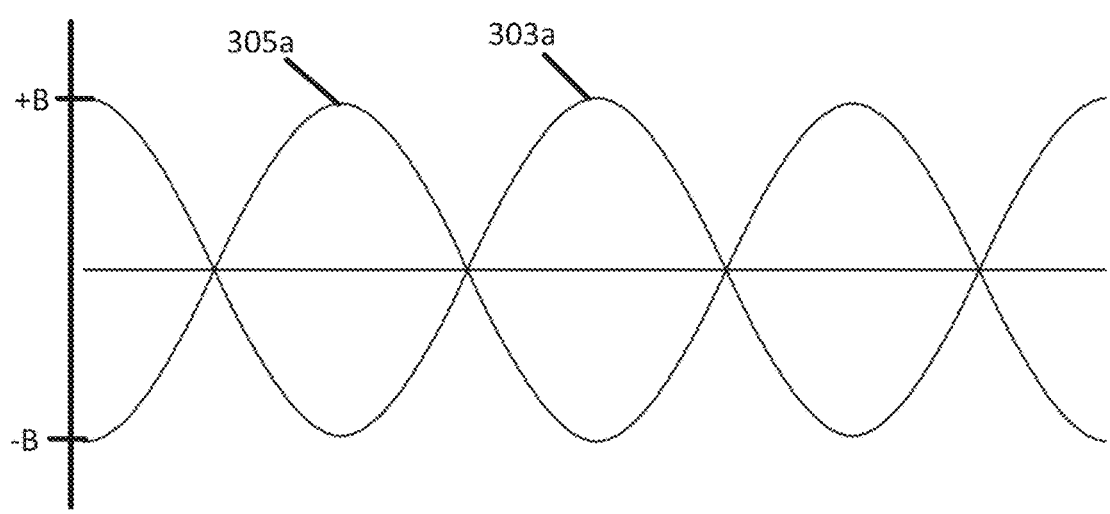

FIGS. 11A and 11B illustrate the output current of the generator in a condition where the generators closed out of phase. In this example, a waveform 303a represents phase A of the first generator, a waveform 303b represents phase B of the first generator, and a waveform 303c represents phase C of the first generator. Further, a waveform 305a represents phase A of the second generator, a waveform 305b represents phase B of the second generator, and a waveform 305c represents phase C of the first generator. FIG. 11B illustrates a single phase, for example, waveforms 303a and 305a.

In the example scenario illustrated by FIG. 11, the generators have connected to the paralleling bus when they were out of phase with each other due to incorrect wiring. The current produced by the first generator, 303a, 303b, 303c is directly opposite the current produced by the second generator 305a, 305b, 305c. This condition may be caused by the alternators attempting to regulate the output to two different voltages.

As illustrated more simply in FIG. 11B, the first generator phase A current 303a lies 180° out of phase from the second generator phase A current 305a. This condition differs from the measured phase between phase A currents seen in FIG. 10B significantly, which may lead to a detection of an incorrect wiring condition.

While the generators are supplying opposite currents, the voltage provided to the paralleling bus 110 and the load 112 may be significantly under the rated voltage of the generator 150 or generator system. This condition may be corrected or improved if one of the two generators is disconnected from the paralleling bus 110.

Detecting the incorrect wiring condition may help to resolve the low bus voltage condition that may be caused by closing the generator sets out of phase, may reduce the stress on the generators 150 and may help to improve the ease of troubleshooting the wiring connection by providing information relating to the system behavior during the condition.

In addition, detecting the incorrect wiring condition may allow adjustments to the synchronization behavior to facilitate correct connection in the next operation sequence of the generator system. The facilitation of correct connection on the next operation sequence may be automatic or a user of concerned party may be notified.

Figure 12:
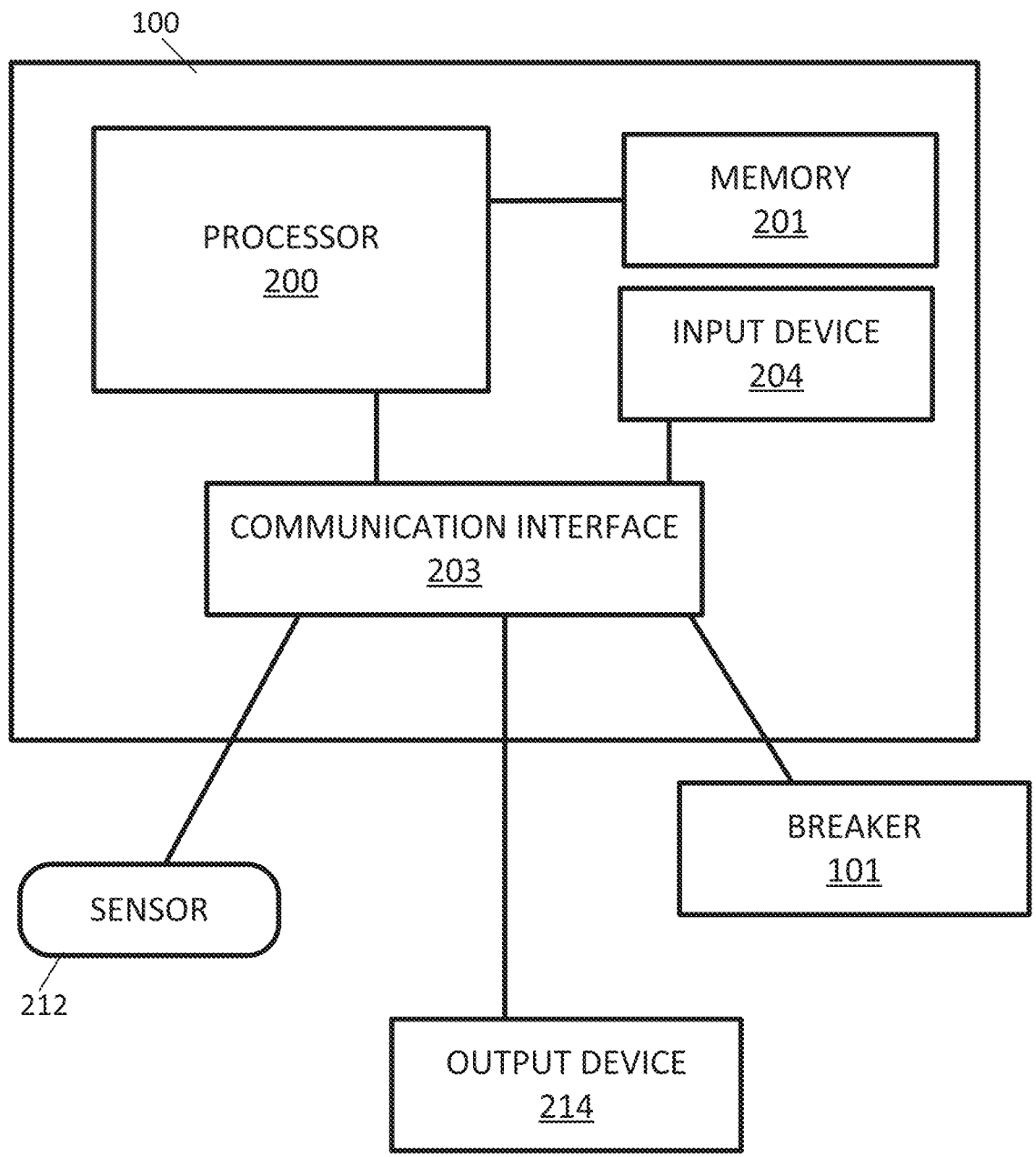
FIG. 12 illustrates an example controller.
Figure 13:
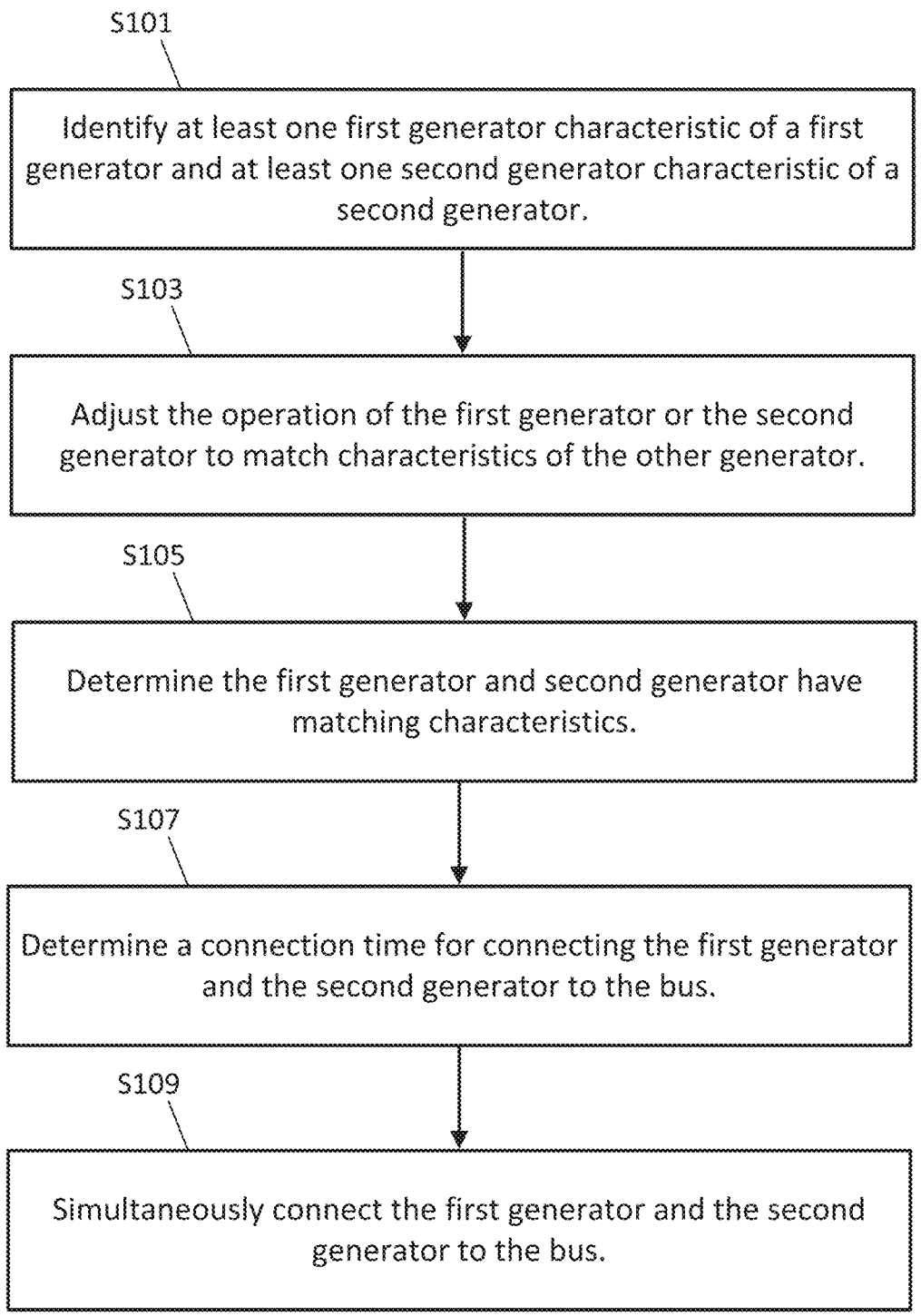
FIG. 13 illustrates a flow chart for the controller of FIG. 12.

FIG. 12 illustrates an example controller 100 which may correspond to any of the generator controllers or the central controller 121 (system controller). The controller 100 may include a processor 200, a memory 201, an input device 204, and a communication interface 203. The communication interface 203 may communicate with one or more sensors 212 such as an electrical sensor that detects the output of one or more of the generators. The sensor 212 may be a voltage sensor, a current sensor, an impedance sensor, an inductive sensor, or another sensor. The sensor 212 may collect data indicative of a zero crossing of the output of one or more of the generators. The detection circuit may be a volt sensor circuit, a current sensor circuit, an impedance sensor circuit, an inductive sensor circuit, or another circuit for supporting a sensor. The controller may include an input device 204 configured to receive one or more settings from a user. The settings may determine whether or not the offline synchronization described here is activated or turned on. The output device 214 may connect the controller 100 to another service such as an engine control unit to control the engine of the generator or a field winding current circuit to control the field winding of the generator. FIG. 13 illustrates an example flowchart for operation of the controller of FIG. 12 for offline synchronization. Additional, different, or fewer acts may be included.

At act S101, the controller 100 identifies at least one first generator characteristic of a first generator and at least one second generator characteristic of a second generator in the plurality of generators. The characteristic may be the data collected by the sensor 212 or derived from the sensor data. The characteristic may describe one or any combination of the amplitude, frequency, phase angle and phase rotation or sequence of the output of the generator. The processor 200 may include a module or may be apportioned to include an application specific controller or integrated circuit as a means for identifying generator characteristics. The memory 201 may store the characteristic data.

At act S103, the controller 100 is configured to adjust the at least one first generator characteristic or the at least one second generator characteristic to match characteristics of the generators with each other. In other words, the controller 100 determines that the amplitude, frequency, phase angle and phase rotation or sequence of the generators are not substantially the same and adjusts the operation of one of the generators to match the other generator(s). Adjustment to the characteristic of the generator may include sending a command through the output device 214 changing the speed of the engine or a field winding current of the alternator. The processor 200 may include a module or may be apportioned to include an application specific controller or integrated circuit as a means for adjusting the generator characteristic. The processor 200 may include a module or may be apportioned to include an application specific controller designated as a synchronizer to equalize important characteristics of the generators before the generators are subsequently connected to the paralleling bus.

At act S105, the controller 100 determines that at least two of the plurality of generators have matching characteristics. The controller 100 may monitor the characteristics of the generators before, during and after act S103 and compare the characteristics off the generator until the measured values are within a predetermined range. When the measures are within the predetermined range, a match is determined. The processor 200 may include a module or may be apportioned to include an application specific controller or integrated circuit as a means for determining the generators have matching characteristics.

At act S107, the controller 100 determines a connection time for connecting the generators to the de-energized paralleling bus. The connection time may be measured from a zero crossing of one of the generators. The generators may exchange messages to coordinate a future time for the connection time based on the detected zero crossings. The processor 200 may include a module or may be apportioned to include an application specific controller or integrated circuit as a means for determining a connection time for connecting the generators to the bus.

At act S109, the controller 100 is configured to generate an instruction to simultaneously connect the at least two generators to the de-energized paralleling bus. The instruction may cause a breaker 101 for each of the generators to close and create an electrical path to the bus. The term substantially the same time means at exactly the same time or within a time range. The time range may be 5, 10, or 20 milliseconds. Other values may be used for the time range. The processor 200 may include a module or may be apportioned to include an application specific controller or integrated circuit as a means for simultaneously connect the generators to the bus. The processor 200 may include a module or may be apportioned to include an application specific controller designated as a sequencer to selectively connect the plurality of generators to the paralleling bus simultaneously.

The controller 100 (e.g., processor 200) may include a module or may be apportioned to include an application specific controller designated as a wiring error detector. At act S107, it is possible that at least of the generators cannot be adjusted to have matching characteristics. That is, when two generators are not wired correctly, it may be impossible for the outputs of the generators to match on all required characteristics (e.g., the amplitude, frequency, phase angle and phase rotation or sequence of the generators). When this occurs the wiring error detector generates a wiring error message that indicates the problem. The wiring error message may be sent to the user through output device 214 or reported to an administrative device. The controller 100 may adjust wiring connections in internally circuitry to fix the wiring error in response to the wiring error message.

The controller 100 (e.g., processor 200) may include a module or may be apportioned to include an application specific controller designated to provide protective functions of the generator. The protective functions may include detection of over current conditions or other faults and operate a relay in response to the faults.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols. The input device 204 may include a button, a switch, a key pad, a touchscreen, or other structure configured to allow a user to enter data. The input device 204 may include a connection to a network, a smartphone, a tablet, a personal computer configured to electronically transmit the trigger command to the control system. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Although the function of the paralleling controller, voltage regulator, generator protection device, and engine speed governor are not always illustrated as separate controllers or as distinct elements in the paralleling system, embodiments are contemplated where each of these elements are separate and distinct. Combining the functions to fewer elements or modules may provide cost advantages and integration advantages but separating the function to individual modules may reduce complexity of each module and reduce part count due to permutations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for paralleling a plurality of generators to a de-energized paralleling bus, the method comprising:
    monitoring an output signal of a first generator of the plurality of generators;
    identifying a property of the output signal of the first generator;
    generating a digital synchronous message including timing data indicative of the property of the output signal;
    sending the digital synchronous message to a second generator of the plurality of generators, wherein at least one generator characteristic of the second generator is adjusted in response to the synchronous message; and
    determining a connection time for simultaneously connecting the first generator and the second generator to the de-energized paralleling bus based, at least in part, on the timing data.

2. The method of claim 1, wherein the property of the output signal is a phase angle.

3. The method of claim 1, wherein the property of the output signal is a zero crossing.

4. The method of claim 1, further comprising:
    determining a connection time for connecting the first generator to the de-energized paralleling bus.

5. The method of claim 1, further comprising:
    receiving a closing time message in response to the synchronous message, the closing time message including one or more compatible closing times for the first generator and the second generator.

6. The method of claim 5, further comprising:
    generating a closing confirmation message in response to a closing time message and indicative that the closing time message has been received.

7. The method of claim 5, further comprising:
    connecting the first generator to the de-energized paralleling bus in response to the closing time message.

8. The method of claim 5, wherein the one or more compatible closing times for the first generator and the second generator are values from a synchronized clock.

9. The method of claim 8, wherein the synchronized clock is based on a wireless network, the internet, a radio signal, a utility power signal, or a satellite signal such as a global positioning system signal.

10. An apparatus for selectively connecting a generator to a paralleling bus through wiring, the apparatus comprising:
    a breaker configured to connect and disconnect the generator to the paralleling bus; and
    a generator controller configured to:
        equalize characteristics of an output of the generator to characteristics of at least one other generator, wherein the generators are selectively connected to the paralleling bus simultaneously in response to a digital reference point message based on the output of the generator; and
        determine a connection time for simultaneously connecting the generators to the paralleling bus in response to the digital reference point message based on the output of the generator.

11. The apparatus of claim 10, wherein the generator controller is configured to send the characteristics of the output of the generator as timing data indicative of the reference point of the output of the generator.

12. The apparatus of claim 10, wherein the reference point of the output signal is a phase angle or a zero crossing.

13. The apparatus of claim 10, wherein the generator controller is configured to receive data for one or more compatible closing times from the at least one generator.

14. The apparatus of claim 13, wherein the one or more compatible closing times for the generators are values from a synchronized clock.

15. The apparatus of claim 14, wherein the synchronized clock is based on a wireless network, the internet, a radio signal, a utility power signal, or a satellite signal such as a global positioning system signal.

16. An apparatus for paralleling a plurality of generators to a de-energized paralleling bus, the apparatus comprising:
    a generator controller configured to:
        monitor an output signal of a first generator of the plurality of generators;
        identify a property of the output signal of the first generator;
        generate a digital synchronous message including timing data indicative of the property of the output signal;
        send the digital synchronous message to a second generator of the plurality of generators, wherein at least one generator characteristic or the second generator is adjusted in response to the digital synchronous message; and
        determine a connection time for simultaneously connecting the first generator and the second generator to the de-energized paralleling bus in response to the digital synchronous message.

17. The apparatus of claim 16, wherein the property of the output signal is a phase angle.

18. The apparatus of claim 16, wherein the property of the output signal is a zero crossing.

* * * * *